United States Patent [19]
Mukawa et al.

[11] Patent Number: 5,341,357
[45] Date of Patent: Aug. 23, 1994

[54] OPTICAL DISC RECORDING APPARATUS

[75] Inventors: Hiroshi Mukawa; Nobuhiko Ando, both of Tokyo, Japan

[73] Assignee: Sony Corporation, Tokyo, Japan

[21] Appl. No.: 806,930

[22] Filed: Dec. 11, 1991

[30] Foreign Application Priority Data

Dec. 21, 1990 [JP] Japan .................. 2-413359

[51] Int. Cl.[5] .......................... G11B 17/022
[52] U.S. Cl. ..................... 369/75.2; 369/79
[58] Field of Search ........... 369/75.1, 78, 79, 75.2; 360/69, 71, 99.06, 99.02

[56] References Cited

U.S. PATENT DOCUMENTS

| | | | |
|---|---|---|---|
| 3,930,653 | 1/1976 | Huff | 369/79 |
| 3,940,148 | 2/1976 | Torrington et al. | 369/79 |
| 4,092,671 | 5/1978 | Camerik | 369/79 |
| 4,158,867 | 6/1979 | Tops et al. | 369/79 |
| 4,412,320 | 10/1983 | Yamakawa | 369/79 |
| 4,763,212 | 8/1988 | Kanno et al. | 360/99.06 |
| 5,012,461 | 4/1991 | Yoshida et al. | 369/44.33 |
| 5,119,252 | 6/1992 | Kamata et al. | 360/99.06 |

FOREIGN PATENT DOCUMENTS

| | | |
|---|---|---|
| 169367 | 10/1983 | Japan . |
| 60-119663 | 6/1985 | Japan . |

OTHER PUBLICATIONS

Patent Abstracts of Japan, vol. 9, No. 259 (P-397), Oct. 17, 1985 & JP-60 107 765 Matsushita, Jun. 13, 1985.
Patent Abstracts of Japan, vol. 10, No. 348 (P-519)(2404), Nov. 22, 1986 & JP-A-61 148 668 (Nippon Kogaku), Jul. 7, 1986.
Patent Abstracts of Japan, vol. 10, No. 237 (P-487)(2293), Aug. 15, 1986 & JP-A-61 068 769 (Hitachi Ltd.), Apr. 9, 1986.
Patent Abstracts of Japan, vol. 10, No. 354 (P-521), Nov. 28, 1986 & JP-A-61 151 870 (Pioneer), Jul. 10, 1986.
Patent Abstracts of Japan, vol. 3, No. 44 (E-104), Apr. 14, 1979 & JP-A-54 021 811 (Matsushita), Feb. 19, 1979.

Primary Examiner—Stuart S. Levy
Assistant Examiner—Paul J. Ditmyer
Attorney, Agent, or Firm—Limbach & Limbach

[57] ABSTRACT

A recording apparatus for an optical disc 101 having ejection inhibiting levers 18, 19 moved at the time of starting the recording mode. These ejection inhibiting levers 18, 19 are retained in the moved position by a locking lever 23 during the recording mode for inhibiting thrusting of an ejection button 17 which may be operated for taking out the optical disc 101. After the end of recording of table-of-contents data on the optical disc 101 following recording of the information signals on the disc 101, the locking lever 23 releases the retention of the ejection inhibiting levers 18, 19 for enabling thrusting of the ejection button 17.

5 Claims, 16 Drawing Sheets

OPTICAL DISC RECORDING APPARATUS

BACKGROUND OF THE INVENTION

1. Field of the Invention

This invention relates to an optical disc recording apparatus for recording information signals on an optical disc by recording means for enabling information signals to be read optically using an optical pickup device.

2. Description of the Prior Art

As an optical disc enabling recording of information signals, there has hitherto been proposed a magneto-optical disc having a signal recording layer permitting so-called perpendicular magnetization. For recording information signals on the magneto-optical disc, a region of the signal recording layer on which to record the information signals is heated to a temperature not lower than the Curie temperature, by means such as irradiating a converged laser beam, whilst an external magnetic field is applied to this region. Since the coercivity of the region of the signal recording layer, thus heated to a temperature not lower than the Curie temperature, is substantially nil, the direction of magnetization of the heated region is inverted to follow that of the external magnetic field. Digitized information signals can be recorded in this manner by inverting the direction of magnetization of the signal recording layer.

An optical disc recording apparatus for writing the information signals on the above described magneto-optical disc includes a driving unit for holding and rotationally driving the magneto-optical disc, an optical pickup unit for irradiating the signal recording layer of the magneto-optical disc with a laser beam, and a magnetic field generating unit for applying an external magnetic field to the signal recording layer.

Meanwhile, if it is desired with the above described optical disk recording apparatus to simplify and reduce the size of the apparatus, a so-called disc loading mechanism, adapted for transporting the magneto-optical disc to the driving device within the optical disc recording apparatus, can not be employed. Thus the optical disc recording apparatus, adapted for meeting the demands for size reduction and simplification of the construction, is provided with a disc table on which the magneto-optical disc is loaded from above, and a hinge-type upper lid for holding the upper surface of the magneto-optical disc placed on the disc table and for preventing leakage of the laser beam to the outside.

With the above described optical disc recording apparatus, if the upper lid is opened during recording of the information signals, and an ejecting operation is performed, the magneto-optical disc can not be maintained in position with respect to the driving device, and thus the recording of the information signals is interrupted. In such case, the information signals recorded until such time can not be read.

That is, since the information signals to be recorded in the optical disc recording apparatus are digital signals, it is necessary to record, after the end of recording of the information signals, so-called table-of-contents data (TOC data) concerning the information recorded on the disc. These TOC data represent signals indicating addresses etc. of the recorded information on the magneto-optical disc. The information signals, the corresponding TOC data of which are not recorded, can not be read.

OBJECTS AND SUMMARY OF THE INVENTION

It is an object of the present invention to provide an optical disc recording apparatus wherein TOC data corresponding to information signals recorded on an optical disc may be recorded reliably.

It is another object of the present invention to provide an optical disc recording apparatus wherein the ejection operation is inhibited until completion of the recording of the information signals to permit the TOC data corresponding to the recorded information to be recorded reliably.

In accordance with the present invention, there is provided an optical disc recording apparatus comprising an ejection inhibiting lever moved in operative association with the start of recording of the information signals on the optical disc for inhibiting an ejecting operation of taking out the optical disc, locking means for inhibiting resetting of said ejection inhibiting lever to an initial position, and controlling means for releasing the inhibition of resetting of said ejection inhibiting lever to said initial position by said locking means after the end of recording of table-of-contents information which is to be recorded after recording of said information signals on said optical disc.

With the optical disc recording apparatus of the present inventions, the locking means for inhibiting the resetting to the initial position of the injection inhibiting lever is only released from an inhibiting state after the end of recording of the table-of-contents information, whereby the ejecting operation is inhibited before the end of the recording of the table-of-contents information.

The above and other objects, features and advantages of the present invention will be apparent from the following detailed description of illustrative embodiments which is to be read in conjunction with the accompanying drawings.

DESCRIPTION OF THE PREFERRED EMBODIMENTS

Figure 1:
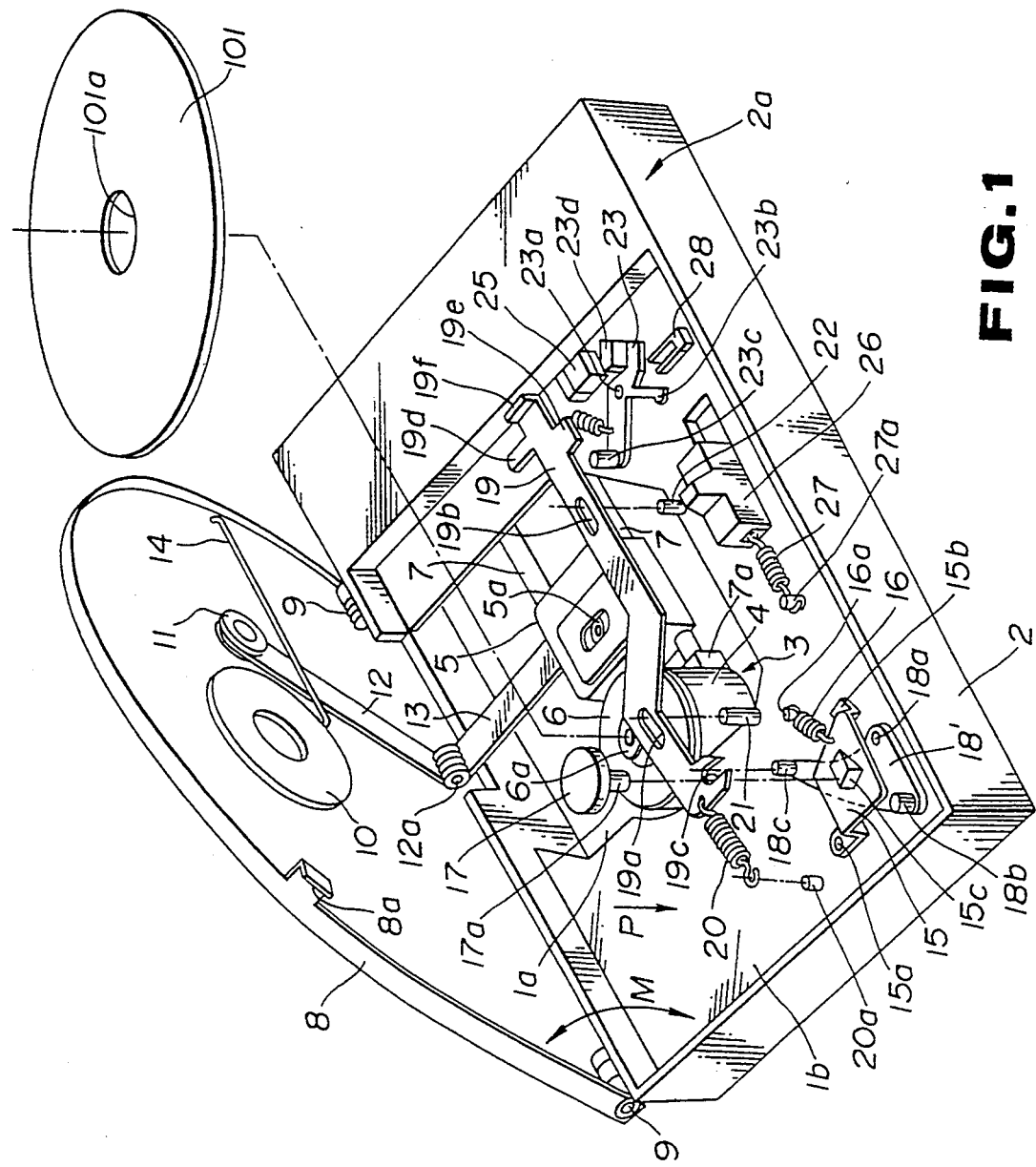
FIG. 1 is a partially exploded perspective view showing the construction of an optical disc recording apparatus according to the present invention.

Referring to the drawings, preferred embodiments of the present invention will be explained in detail.

First Embodiment

Figure 2:
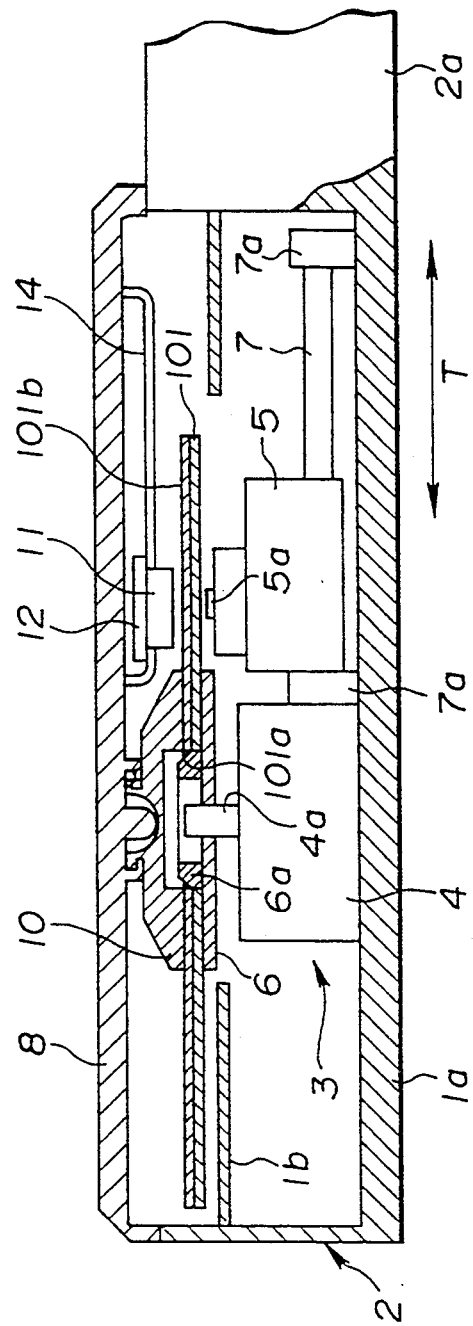
FIG. 2 is an enlarged longitudinal cross-sectional view showing the construction of the optical disc recording apparatus shown in FIG. 1.

Referring first to FIGS. 1 and 2, the present optical disc recording apparatus is provided with an outer casing 2 having a bottom surface arranged as a chassis 1a. The outer casing 2 is opened at the upper side except for a battery storage section 2a, which storage section stores dry cells or charging type batteries for supplying the driving current to parts or components making up the optical disc recording apparatus.

Within the outer casing 2, there is provided a spindle motor 4 of a driving device 3 for holding and rotationally driving a magneto-optical disc 101, which is an optical disc on which to record information signals.

The spindle motor 4 is fixedly mounted on the chassis 1a and constitutes the driving device 3 in cooperation with a disc table 6 mounted on a spindle shaft 4a of the spindle motor 4. A tapered central centering member 6a is provided on a disc rest surface of the disc table 6. The centering member 6a is engaged with a central aperture 101a of the magneto-optical disc 101 for centering the disc 101 with respect to the spindle shaft 4a.

An optical pickup device 5 is provided within the outer casing 2 and includes an optical block within which are enclosed a semiconductor laser (not shown) functioning as a light source, a plurality of optical devices including an object lens 5a for transmitting and converging a laser beam from the semiconductor laser for irradiation on the magneto-optical disc 101 resting on the driving device 3, and a photodetector (not shown) for receiving the laser beam reflected from the disc 101 by means of the optical devices. The optical pickup device 5 is supported by parallel supporting shafts 7, 7 supported by supporting members 7a, 7a on the chassis 1a. The optical pickup device 5 is moved along the supporting shafts 7, 7 radially of the disc 101, carried by the driving device 3, as shown by an arrow T in FIG. 2, by driving means, not shown. That is, the magneto-optical disc 101 is rotationally driven by the driving device 3, whilst the optical pickup device 5 is moved along the supporting shafts 7, 7 by the driving means, so that the laser beam from the optical pickup device 5 may be radiated on substantially the entire surface of the magneto-optical disc 101.

A lid 8 for opening or closing an open upper surface of the outer casing 2 is mounted on the outer casing 2. The lid 8 has its side edge pivotally mounted by pivot shafts 9, 9 on one side edge of the outer casing 2 so that the lid may be pivoted in the direction of opening or closing the upper side of the outer casing 2 as indicated by an arrow M in FIG. 1.

A chuck member 10 is mounted on a portion of the lid 8 which will face the disc table 6 when the lid 8 is in the closed position. The chuck member 10 is substantially disc-shaped and is mounted for rotation relative to the lid 8. When the magneto-optical disc 101 is placed on the disc table 6, and the lid 8 is closed, the chuck member 10 holds the rim of the central aperture 101a of the magneto-optical disc 101 in cooperation with the disc table 6, as shown in FIG. 2.

The recording apparatus also includes a magnetic field generating coil 11 moved radially of the magneto-optical disc 101 in synchronism with the optical pickup device 5 which is supported by the supporting shafts 7, 7 and which is moved radially of the magneto-optical disc 101, as explained hereinabove. This magnetic field generating coil 11 is mounted at the distal end of a coil supporting arm 12 rotatably mounted by means of a pivot shaft 12a on the distal end of a connecting arm 13 having its proximal end supported by the optical pickup device 5. Since the coil supporting arm 12 is connected in this manner to the optical pickup device 5 by means of the connecting arm 13, the magnetic field generating coil 11 mounted on the coil supporting arm 12 may be moved in synchronism with the optical pickup device 5.

The coil supporting arm 12 is rotated about the pivot shaft 12a at the proximal side thereof as the center of rotation for bringing the magnetic field generating coil 11 at the distal end thereof into and out of contact with the magneto-optical disc 101.

Meanwhile, rotation of the coil supporting arm 12 is performed in operative association with the opening and closing movements of the lid 8. That is, the coil supporting arm 12 is extended along the inner surface of the lid 8 and supported at an intermediate portion thereof by a supporting stay 14 mounted on the inner lateral surface of the lid 8, so that the arm 12 may be rotated in operative association with the opening and closing movements of the lid 8.

Meanwhile, the supporting stay 14 is in the form of a substantially U-shaped rod, both ends of which are secured to the inner surface of the lid 8. The supporting stay 14 is of a length at least equal to the distance between the inner and outer peripheries of the signal recording region of the magneto-optical disc 101 to permit the magnetic field generating coil 11 to travel across the inner and outer peripheries of the magneto-optical disc 101.

The coil supporting arm 12, having its mid portion supported by the supporting stay 14, is rotated in operative association with the opening and closure of the lid 8, so that, when the lid 8 has been rotated to its opening position, the arm 12 is rotated simultaneously with the lid 8 to open the upper side of the disc table 6 to permit the magneto-optical disc 10 to be loaded on the disc table 6.

On the other hand, when the lid 8 is rotated in the direction of closing the outer casing 2, the coil supporting arm 12 is also rotated in the same direction for bringing the magnetic field generating coil 11 mounted on the distal end of the coil supporting arm 12 to a position close to and facing a major surface of the magneto-optical disc 101 held on the disc table 6. When the magnetic field generating coil 11 is brought to a position close to the major surface of the magneto-optical disc 101, the coil supporting arm 12 is floated up from the supporting stay 14 and brought to a non-contacting state so that the coil supporting arm may be moved i n synchronism with the optical pickup device 5.

A supporting plate 1b is provided within the outer casing 2 so that the supporting plate 1b is slightly closer to the chassis 1a than the disc table 6. A lid locking lever 15 is provided on the supporting plate 1b for retaining the lid 8 in its closure position. The lid locking lever 15 is rotatably mounted on the supporting plate 1b by means of a pivot axis 15a and is rotationally biased by a first tension coil spring 16, provided between the lever 15 and a retention pin 16a provided on the supporting plate 1b, in a direction in which a retention pawl 15b formed at the free end side of the lever 15 is moved towards the lid 8, as indicated by an arrow C in FIG. 3. A mating retention pawl 8a is provided at a portion of the side edge of the lid 8 which is in register with the retention pawl 15b. That is, when the lid 8 is closed, the retention pawl 15b is engaged with the mating retention pawl 8a for locking the lid 8 in the closed position.

A projection with an inclined surface 15c is protrudingly formed on the upper surface of the lid locking lever 15. An ejection button 17 is mounted to engage the inclined surface 15c of the lid locking lever 15. The ejection button 17 is supported by the outer casing 2 so as to be movable into and out of contact with the supporting plate 1b, and has a thrusting section 17a, protuberantly formed towards the supporting plate 1b, in contact with the inclined surface 15c.

Figure 6:
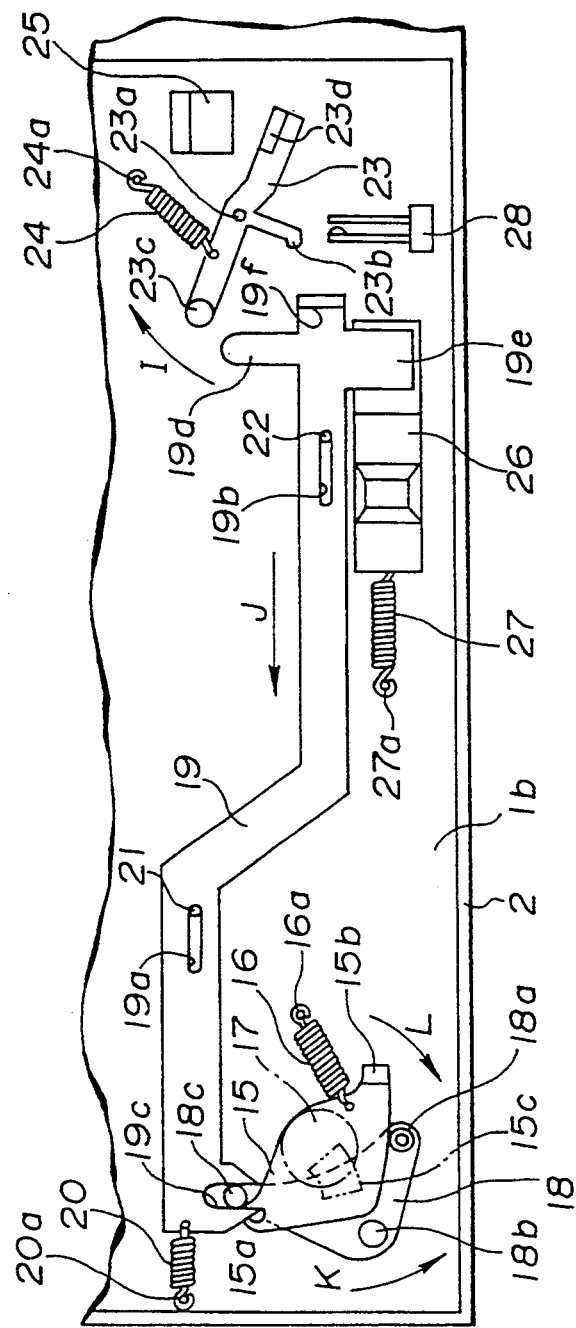
FIG. 6 is an enlarged plan view schematically showing the status of the ejection locking lever when the recording of TOC data is terminated after the recording state of the optical disc recording apparatus is released.

When the ejection button 17 is thrust in a direction of approaching the supporting plate 1b, as indicated by an arrow P in FIG. 1, the thrusting section 17a thrusts the inclined surface 15c. Then, under a thrusting force exerted by the thrusting section 17a on the inclined section 15c, the lid locking lever 15 is rotated in a direction of displacing the retention pawl 15b away from the lid 8, as indicated by an arrow L, while the inclined surface 15c is kept in sliding contact with thrusting section, as shown in FIG. 6. At this time, retention of the mating retention pawl 8a by the retention pawl 15b is released to enable the lid 8 to be opened or closed. With the lid 8 in the opened position, the magneto-optical disc 101 may be loaded and unloaded on or from the driving device 3.

The present optical disc recording apparatus is provided with an ejection locking unit for inhibiting opening of the lid 8 termination of the recording of information signals on the magneto-optical disc and the recording of so-called table-of-contents data (TOC) data on the disc.

These TOC data are signals indicating addresses etc. on the magneto-optical disc 101 of the information signals recorded on the disc 101, and are recorded on the disc 101 after the end of the recording of the information signals.

Figure 3:
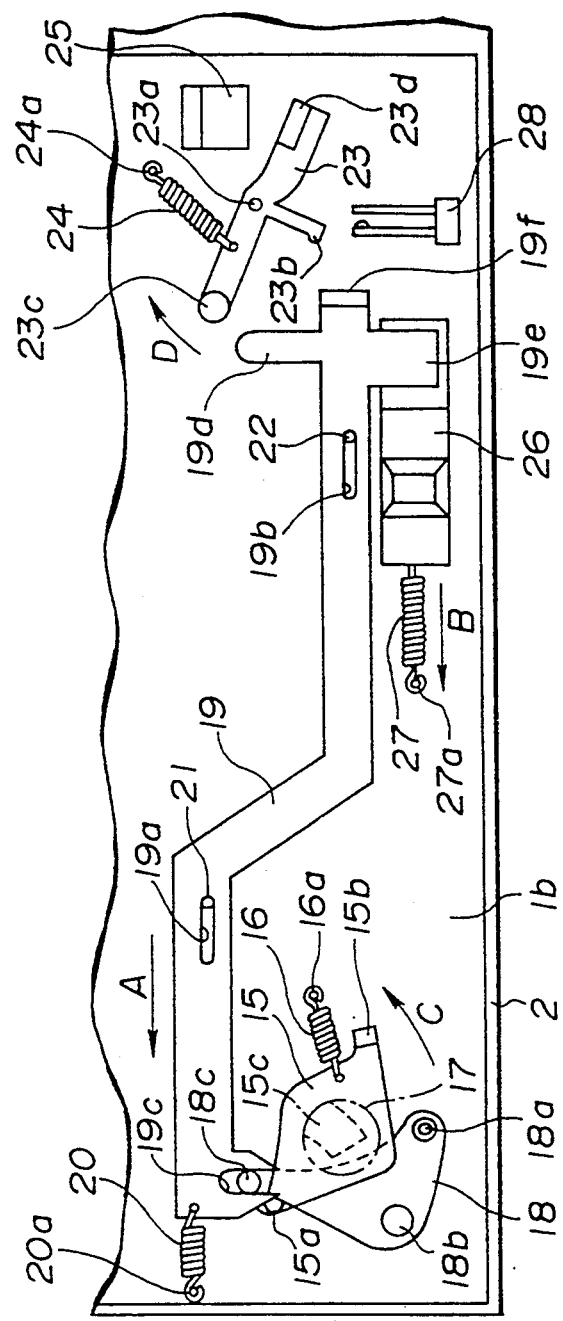
FIG. 3 is an enlarged plan view schematically showing the construction of an ejection locking lever as a main component of the optical disc recording apparatus.

Referring to FIG. 3, the ejection locking unit is comprised of first to third ejection locking levers 18, 19 and 23. The first ejection locking lever 18 is mounted on the supporting plate 1b between the lid locking lever 15 and the supporting plate 1b for rotation about a pivot pin 18a as a center of rotation. An ejection locking pin 18b and an engaging pin 18c are implanted on the first ejection locking lever 18. This ejection locking pin 18b is provided on the side of the first ejection locking lever 18 towards a direction opposite to the direction which is shown by arrow C in FIG. 3 and which is the direction of rotation of the lid locking lever 15 of releasing retention of the lid 8. The engaging pin 18c is engaged in an engaging notch 19c formed at one end of the second ejection locking lever 19.

The second ejection locking lever 19 is substantially rod-shaped and provided with oblong holes 19a, 19b into which supporting pins 21, 22 implanted on the supporting plate 1b are introduced to permit a longitudinal sliding movement of the ejection locking lever 19. This ejection locking lever is biased towards its end provided with the engaging notch 19c as indicated by arrow A by a second tension coil spring 20 installed between the ejection locking lever and an engaging pin 20a implanted on the supporting plate 1b.

A thrust lug 19e, a mating retention lug 19d and a thrusting lug 19f are formed on the other end of the second ejection locking lever 19. The thrust lug 19e and the mating retention lug 19d are formed on opposite sides at the other end of the ejection locking lever 19 for extending in mutually opposite directions. The thrust lug 19e is positioned for facing a recording setting button 26 provided on the supporting plate 1b. The recording setting button 26 is mounted on the supporting plate 1b for movement along a direction along the length of the second ejection locking lever 19 and is biased by a third tension coil spring 27 installed between the recording setting button and an engaging pin 27a provided on the supporting plate 1b in a direction towards the one end of the second ejection locking lever 19 as indicated by arrow B in FIG. 3, that is in the same direction as the biasing direction of the second ejection locking lever 19.

The thrusting lug 19f is formed by upwardly bending the other end of the second ejection locking lever 19. A microswitch 28 for initiating the recording mode is mounted on the supporting plate 1b for facing the thrusting lug 19f.

The third ejection locking lever 23 is mounted in the vicinity of the other end of the second ejection locking lever 19 for rotation about a pivot pin 23a implanted on the supporting plate 1b. A retention pin 23c is implanted on one end of the third ejection locking lever 23, on the other end of which is mounted an armature 23d functioning as locking means. The retention pin 23c faces the mating retention lug 19d of the third ejection locking lever 19. The armature 23d, formed of a permanent magnet or magnetic metal, such as iron, is provided on the supporting plate 1b for facing a trigger coil 25 functioning as control means. This trigger coil 25 is comprised of a core formed of magnetic metal such as iron or permanent magnet and a solenoid coil placed around the core. The third ejection locking lever 23 is rotationally biased by a fourth tension coil spring 24, installed between the lever 23 and an engaging pin 24a provided on the supporting plate 1b, in a direction of displacing the armature 23d and the trigger coil 25 away from each other, as shown by an arrow D in FIG. 3.

A thrust lug 23b is formed at a mid point of the third ejection locking lever 23 for facing the thrusting lug 19f of the second ejection locking lever 19.

Figure 4:
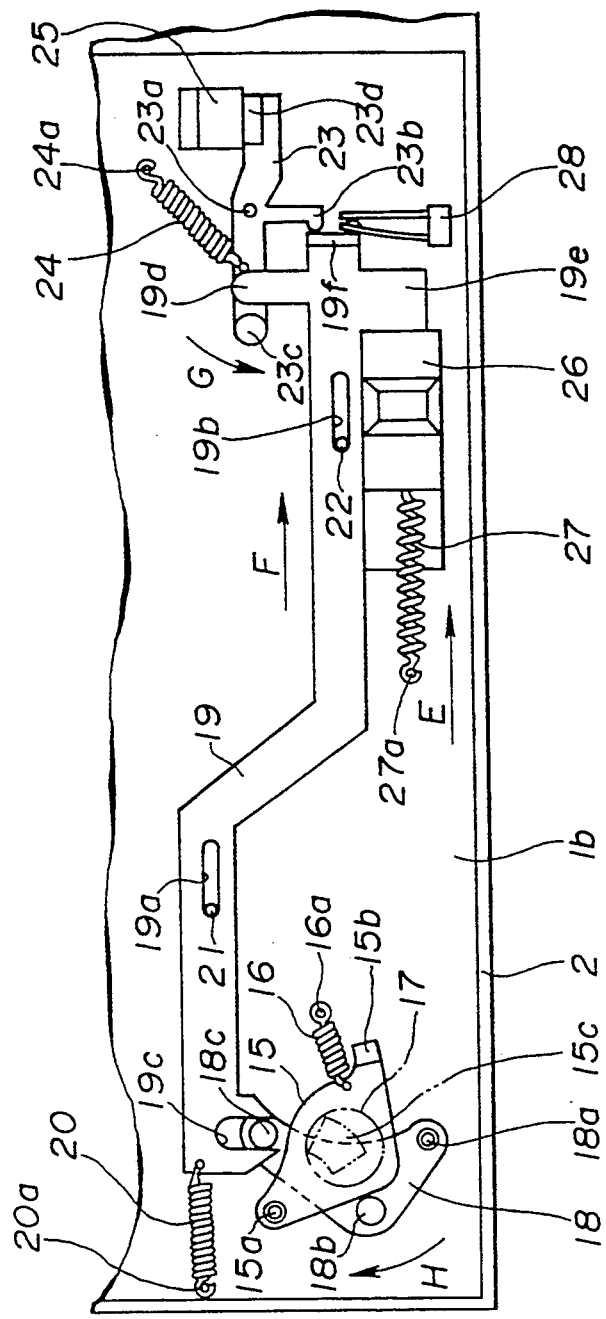
FIG. 4 is an enlarged plan view schematically showing the status of the ejection locking lever when the optical disk recording apparatus is about to be set to the recording mode.

With the above described present optical disc recording apparatus, when the recording setting button 26 is shifted against the bias of the third tension coil spring 27, as shown by arrow E in FIG. 4, the recording setting button 26 thrusts against the thrust lug 19e of the third ejection locking lever 19. This second ejection locking lever 19, having its thrust lug 19e thrust in this manner, is moved towards its other end, as shown by arrow F in FIG. 4.

With the second ejection locking lever 19 thus shifted towards its other end, the microswitch 28 is contacted by the thrusting tug 19f and thereby turned on for setting the optical disc recording apparatus to its recording mode. On the other hand, the third ejection locking lever 23, having its thrust lug 23b thrust by the thrusting 19f, is rotated against the bias of the fourth tension coil spring 24 in a direction of contacting the armature 23d with the trigger coil 25 as shown by arrow G in FIG. 4. When the armature 23d and the trigger coil 25 are contacted with each other in this manner, the armature 23d and the trigger coil 25 are attracted to each other, so that the third ejection locking lever 23 is locked with the armature 23d contacting with the trigger coil 25. At this time, the retention pin 23c is positioned for facing the side of the mating retention lug 19d directed towards the one end of the second ejection locking lever 19.

When the second ejection locking lever 19 is shifted towards its other end, the first ejection locking lever 18 has the engaging pin 18c displaced along with the second ejection locking lever 19, so that the first ejection locking lever 18 is rotated for bringing the ejection locking pin 18b into proximity of the lid lock lever 15 as shown by arrow H in FIG. 4.

When the thrusting on the recording setting button 26 is removed, the recording setting button is reset to its initial position under the bias of the third tension coil spring 27. However, when the second ejection locking lever 19 is moved slightly towards its one end, it is halted by the mating retention lug 19d engaged with and retained by retention pin 23c of the third ejection lock lever 23. Therefore, even if the ejection button 17 is thrust at this time for rotating the lid locking lever 15, the lever 15 is abutted at this time on ejection locking pin 18b of the first ejection locking lever 18 so that rotation of the lever 15 is inhibited and hence it can not be rotated. Thus, with the recording mode of the optical disc recording apparatus, opening of the lid 8 is inhibited.

Figure 5:
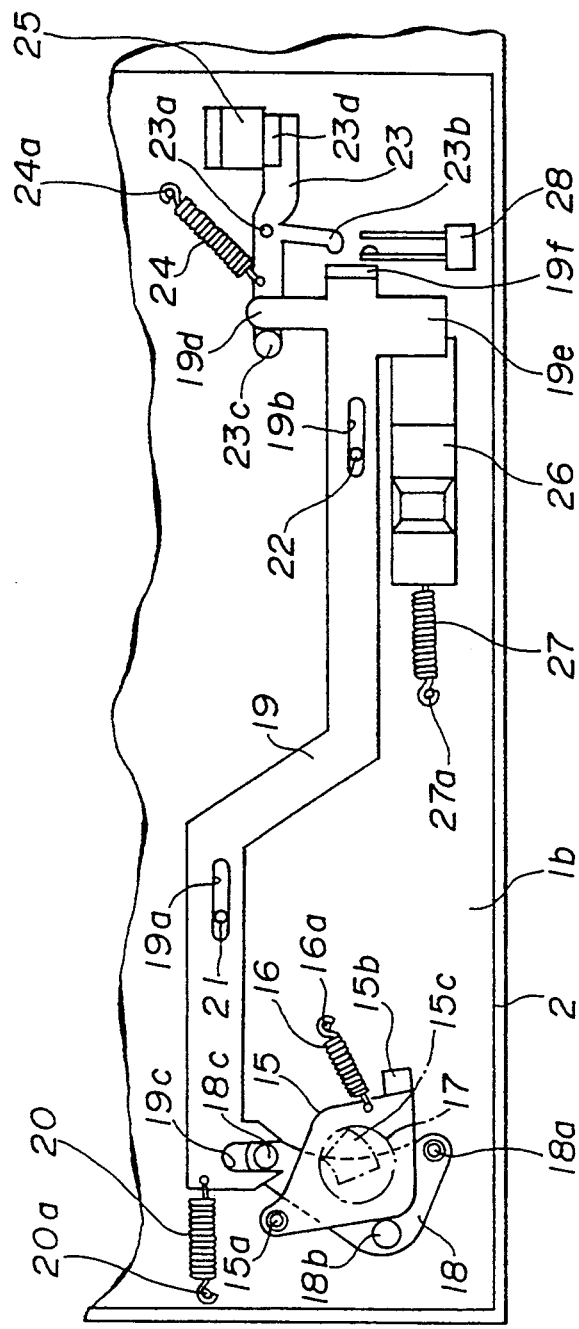
FIG. 5 is an enlarged plan view schematically showing the status of the eject lock lever when the optical disk recording apparatus has been set to the recording mode.

When a stop button etc., not shown, is actuated for releasing the recording mode of the present optical disc recording apparatus, recording of the information signals on the magneto-optical disc is terminated and recording of the TOC data is initiated. During the recording of the TOC data, the ejection locking levers 18, 19 and 23 are kept in the state of the above mentioned recording mode shown in FIG. 5. Therefore, with the present optical disc recording apparatus, the opening of the lid 8 is inhibited even during the recording of the TOC data.

When the recording of the TOC data comes to a close, the trigger coil 25 is fed with a current from a controller, not shown, which current generates a magnetic field counteracting the force of attraction between the attractable member 23d and the trigger coil 25.

The third ejection locking lever 23 is then rotated and reset to its initial position, as shown by an arrow I in FIG. 6, under the bias of the fourth tension coil spring 24, as shown in FIG. 6. The second ejection locking lever 19 is released from retention of the mating retention lug 19d by the retention pin 23c of the third ejection locking lever 23 so that the lever 19 is moved towards its one end, as shown by arrow J in FIG. 6, under the bias of the second tension coil spring 20, so as to be reset to its initial position. With the second ejection locking lever 19 thus reset to its initial position, the first ejection locking lever 18 is rotated as shown by arrow K in FIG. 6 so as to be reset to its initial position.

Therefore, if the ejection button 17 is operated at this time, the lid locking lever 15 is rotated in the direction of displacing the retention pawl 15b away from the lid 8 as shown by arrow L in FIG. 6 to permit opening of the lid 8. That is, with the present optical disc recording apparatus, the opening of the lid 8 is enabled when the recording of the TOC data is terminated.

Second Embodiment

Figure 16:
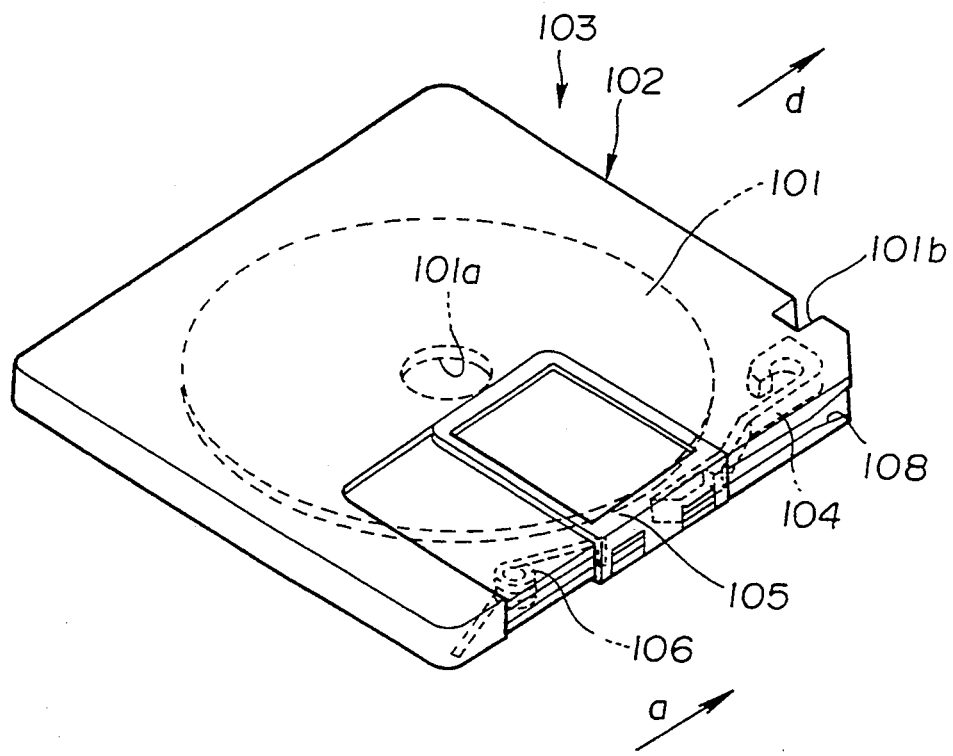
FIG. 16 is a perspective view showing the construction of a disc cartridge employed in the optical disc recording apparatus shown in FIG. 7.
Figure 17:
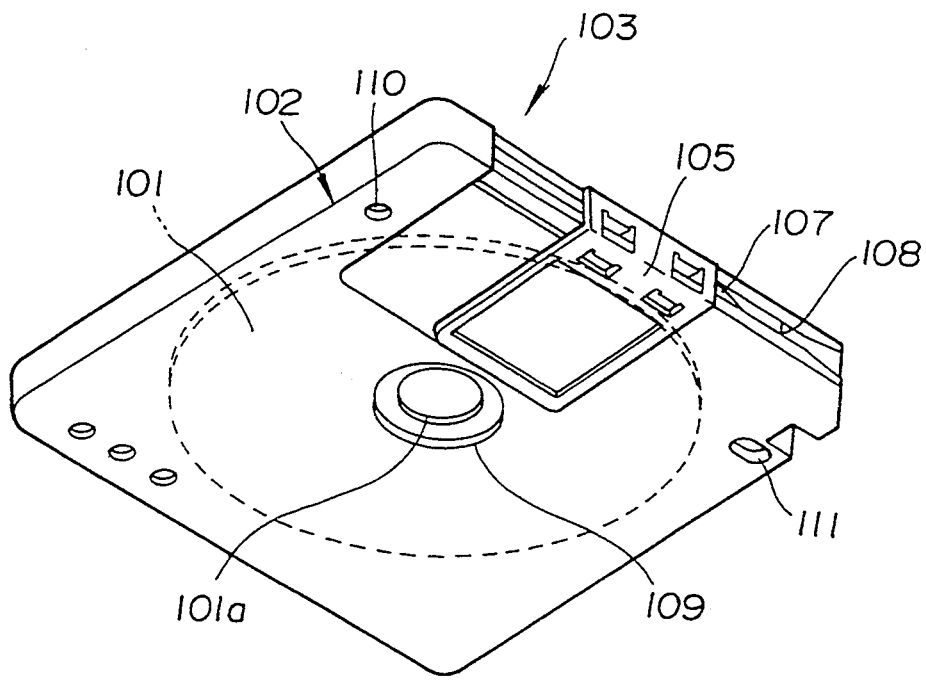
FIG. 17 is a perspective view showing the construction of the lower surface of the disc cartridge shown in FIG. 16.

With an optical disc recording apparatus of the present embodiment, a disc cartridge 103 comprised of the magneto-optical disc 101 accommodated in a cartridge proper 102 as shown in FIGS. 16 and 17 is loaded in the recording apparatus for recording information signals on the magneto-optical disc 101.

With the above disc cartridge 103, the magneto-optical disc 103, on and from which information signals can be recorded or read, is accommodated in the cartridge proper 102, as shown in FIGS. 16 and 17.

The magneto-optical disc 101 includes a signal recording layer magnetizable in the perpendicular direction and a base layer of polycarbonate or the like material carrying the signal recording layer. With the magneto-optical disc 101, the signal recording layer is heated by converged irradiation of the laser beam, at the same time that an external magnetic field is applied for changing the direction of magnetization of micro-sized regions or domains of the signal recording layer for writing the information signals. These information signals may be read by irradiating the signal recording layer with a laser beam and detecting the direction of polarization of the reflected light from the signal recording layer.

The magneto-optical disc 101 is rotatably mounted in the cartridge proper 102 formed as a rectangular casing. This cartridge proper 102 is formed with recording/reproducing apertures for exposing both sides of a portion of the magneto-optical disc 101 across its inner and outer peripheries to outside. These recording/reproducing apertures may be opened or closed by a shutter member 105 which is mounted on the outer sides of the cartridge proper 102 ad which is slidable from a position of closing the recording/reproducing apertures to the position of opening these apertures in an inserting direction of the disc cartridge 103 as indicated by arrow d in FIG. 16. The shutter member 105 is biased by a spring 106 provided within the cartridge proper 102 towards the side of closing the apertures as shown by arrow a in FIG. 16. A locking member 104 for retaining the shutter member 105 when in the position of closing the apertures is provided within the cartridge proper 102. The locking member 104 is partially exposed to outside by an unlocking slit 108 formed on a lateral side of the cartridge proper 102.

The cartridge proper 102 is provided with a chucking aperture 109 for exposing a central chuck hole 101a formed in the magneto-optical disc 101. Positioning holes 110, 111 are provided at the corners of a side of the disc cartridge 102 which is formed with the chucking aperture 109. Meanwhile, an iron piece adapted to be attracted to a magnet of a disc table 205 as later described is attached to the rim of the chuck hole 101a.

It is noted that the magneto-optical disc 101 employed in the optical disc recording apparatus has a diameter of an order of 64 mm and a thickness of an order of 1.2 mm, while the cartridge proper 102 has a length of each side of an order of 68 to 72 mm and a thickness of an order of 5 mm.

Figure 7:
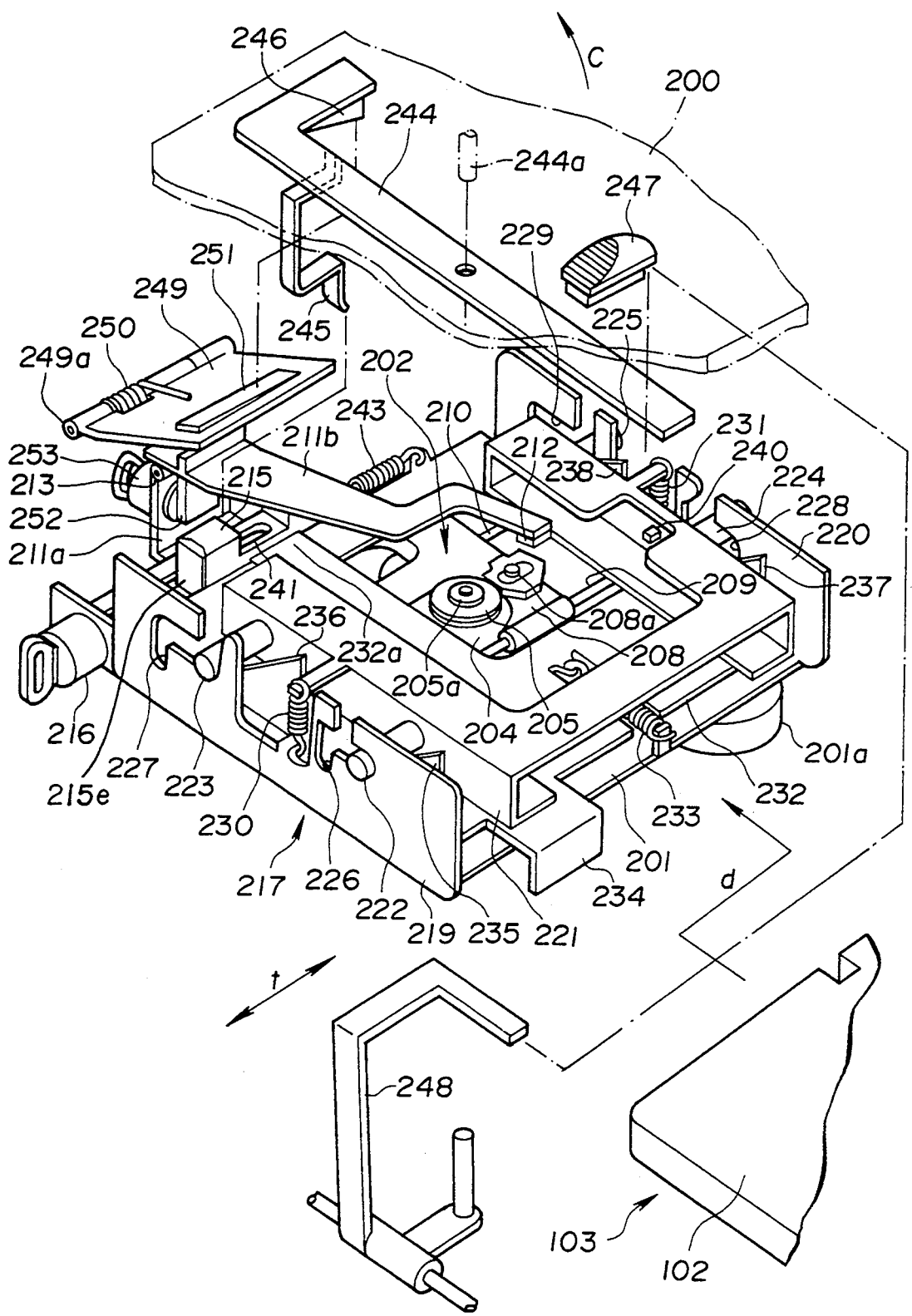
FIG. 7 is a partially exploded perspective view showing essential parts of a modified embodiment of an optical disc recording apparatus according to the present invention.

Referring to FIG. 7, the optical disc recording apparatus has a chassis 201 supported within an outer casing 200 by means of a plurality of dampers 201a.

Each damper 201a is formed of rubber or the like flexible material in the form of a hollow cylinder, the inside of which is filled with a moderately viscous fluid material. In consideration of weight equilibrium of the chassis 21 with the above mentioned components, the above mentioned dampers are provided at plural positions for isolating the mechanical components of the optical disc recording apparatus mounted on the chassis 201 from vibrations or impacts propagated from outside by means of the outer casing 200.

A driving device 202, on which the magneto-optical disc 101 of the disc cartridge 103 is loaded, is provided on the chassis 201. The driving device 202 includes a spindle motor 204 and a disc table 205 mounted on a driving shaft of the spindle motor 204. The spindle motor 204 has a driving shaft extending substantially normal to the chassis 201. When the magneto-optical disc 101 is placed on the disc table 205, the disc table has its central tapered projection 205a engaged in the chuck hole 101a. The disc table 205 is provided with a magnet adapted for magnetically attracting a magnetic plate mounted on the disc for overlying the chuck hole 101a.

On the chassis 201, there is mounted an optical pickup device 208 for movement between a position facing the inner periphery of the magneto-optical disc 101 placed on the disc table 205 and a position facing he outer periphery of the disc 101. Similarly to the optical pickup device 5, the optical pickup device 208 has an optical block which is formed by aluminum diecasting or of synthetic resin and in the inside of which a light source such as a semiconductor laser, a photodetector such as a photodiode and a plurality of predetermined optical devices are enclosed. The optical pickup device 208 is adapted for converging and outputting the light flux radiated from the light source. The optical pickup device 208 is also adapted for detecting the light outputted from the object lens 208a and reflected back from the magneto-optical disc 101 by the above mentioned photodetector by the interposition of the object lens 208a.

The optical pickup device 208 has its optical block supported by a guide shaft 209 provided on the chassis 201 and by a supporting shaft 210 provided on the chassis 201 in parallel with the guide shaft, and may be moved along the chassis 201 in a direction across the inner and outer peripheries of the magneto-optical disc 101 placed on the disc table 205, as shown by an arrow t in FIG. 7.

The optical pickup device 208 is supported with the object lens 208a facing the side of the magneto-optical disc 101 facing the chassis 201. Thus the optical pickup device 208 is so arranged that the magneto-optical disc 101 placed on the disc table 205 may be faced by the object lens 208a across the inner and outer peripheries of the disc 101.

On the optical pickup device 208, a magnetic head device 212 provided with a magnetic field generating coil is mounted by the interposition of first and second magnetic head supporting arms 211a, 211b. The first magnetic head supporting arm 211a has its proximal end attached to the optical pickup device 208 and is bent in the form of a letter L so that its proximal end is attached to the optical pickup device 208 and its distal end is removed from the chassis 201. The second magnetic head supporting arm 211a, formed as a substantially flat plate, has its proximal end rotatably mounted on the distal end of the first magnetic head supporting arm 211a by means of a pivot 213. The above mentioned magnetic head device 212 is mounted on a side of the distal end of the second magnetic head supporting arm 211b facing the chassis 201.

The magnetic head device 212 faces the object lens 208a. Even when the optical pickup device 208 is moved along the guide shaft 209, the magnetic head device 212 is moved together with the magnetic head supporting arm 211 for perpetually facing the object lens 208a. The second magnetic head supporting arm 211b is rotated with respect to the first magnetic head supporting arm 211a about the pivot 213 as the center of rotation for bringing the magnetic head device 212 into or out of contact with the object lens 208a. A tension coil spring 214 is installed between the proximal end of the second magnetic head supporting arm 211b and the first magnetic head supporting arm 211a. This tension coil spring 214 rotationally biases the second magnetic head supporting arm 211b in a direction in which the magnetic head device 212 is displaced away from the object lens 208a, as shown by arrow c in FIGS. 7 and 8.

On the chassis 201 is provided a magnetic head lift device for rotating the second magnetic head supporting arm 211b with respect to the first magnetic head supporting arm 211a. The lift device is adapted for moving the magnetic head 212 towards the object lens 208a in operative association with the operation on a recording setting button 247 of setting the recording mode of the optical disc recording apparatus.

The recording button 247 is provided on the forward upper surface of the outer casing 200. This recording button is supported by the outer casing 200 for sliding in the lateral direction, that is, across the side plates 219, 220. The recording button 247 is resiliently biased by biasing means, not shown, towards its initial position on one side of the outer casing 200. When moved towards the other side of the outer casing, as shown by arrow k i n Fi g. 13, the recording setting button 247 turns on a microswitch for recording mode initiation, not shown, for setting the optical recording apparatus to the recording mode.

A recording setting transmission lever 244 is rotatably supported within the outer casing 200 by means of a pivot shaft 244a. This recording setting transmitting lever 244 is extended from the forward side towards the rear side of the outer casing 200 and has its mid point rotatably supported by an upper plate of the outer casing 200. The forward side of the recording setting transmission lever 244 is positioned in the vicinity of and within the ambit of movement of the recording setting button 247. Thus, when the recording setting button 247 is actuated, the recording setting transmission lever 244 is rotated by the recording setting button 247 so that the one end of the lever is moved towards the other lateral side of the casing 200, as shown by arrow n in FIG. 13.

The other end of the recording setting transmission lever 244 is positioned towards the rear of the outer casing 200 for facing a magnetic head supporting arm thrusting plate 249 provided at the rear side of the outer casing 200. The thrusting plate 249 is rotatably mounted on the inner wall section of the outer casing 200 by means of a pivot shaft 249a. The magnetic head supporting arm thrusting plate 249 is arranged parallel to the second magnetic head supporting arm 211b and the upper plate of the outer casing 200 between the proximal end of the second magnetic head supporting arm 211b and the upper plate of the outer casing 200. The thrusting plate 249 may be rotated into and out of contact with the chassis 201 by means of the pivot shaft 249a. The thrusting plate 249 is rotationally biased by a torsion coil spring 250 supported by the pivot shaft 249a in a direction away from the second magnetic head supporting arm 211b, that is, in a direction of thrusting the recording setting transmission lever 244, as shown by arrow p in FIG. 8.

Figure 8:
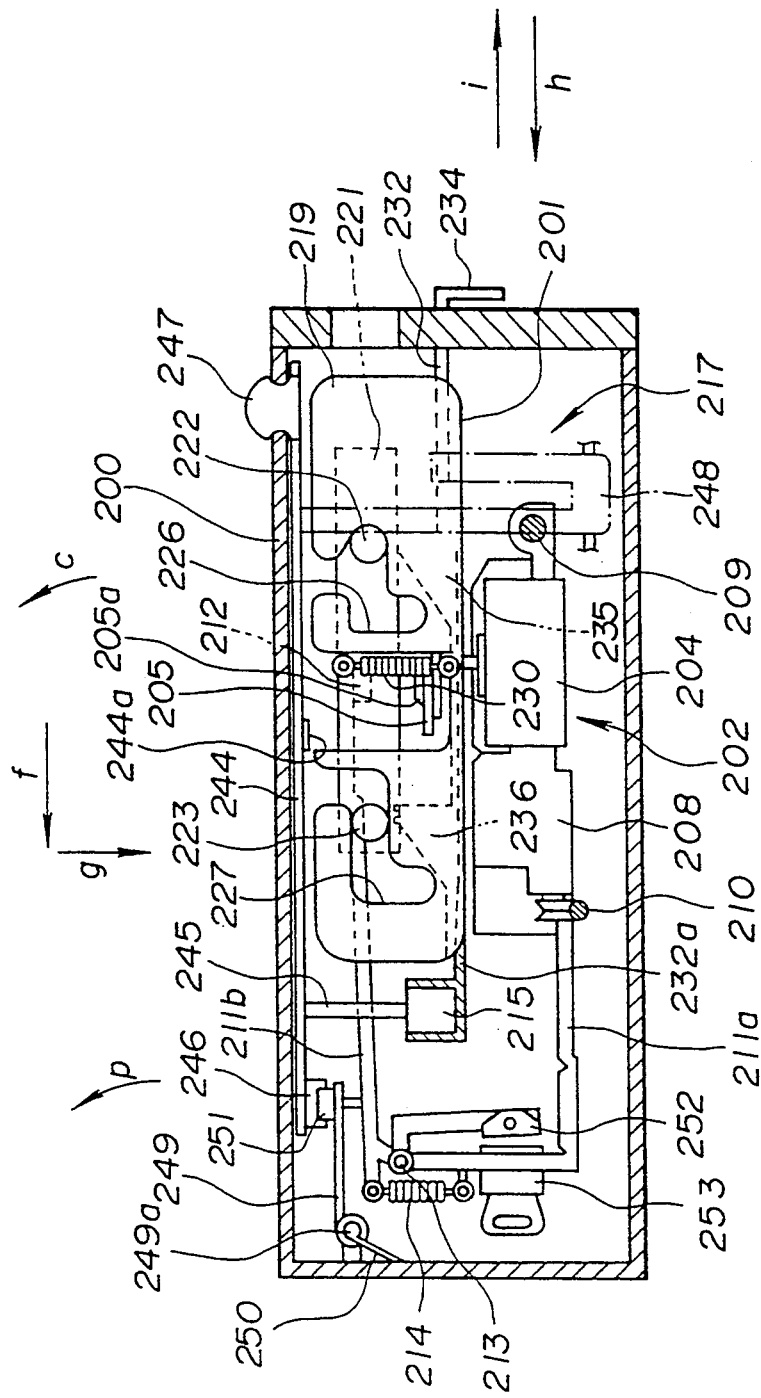
FIG. 8 is a side view, partially in cross-section, showing the pre-loading state of the optical disc recording apparatus shown in FIG. 7.
Figure 9:
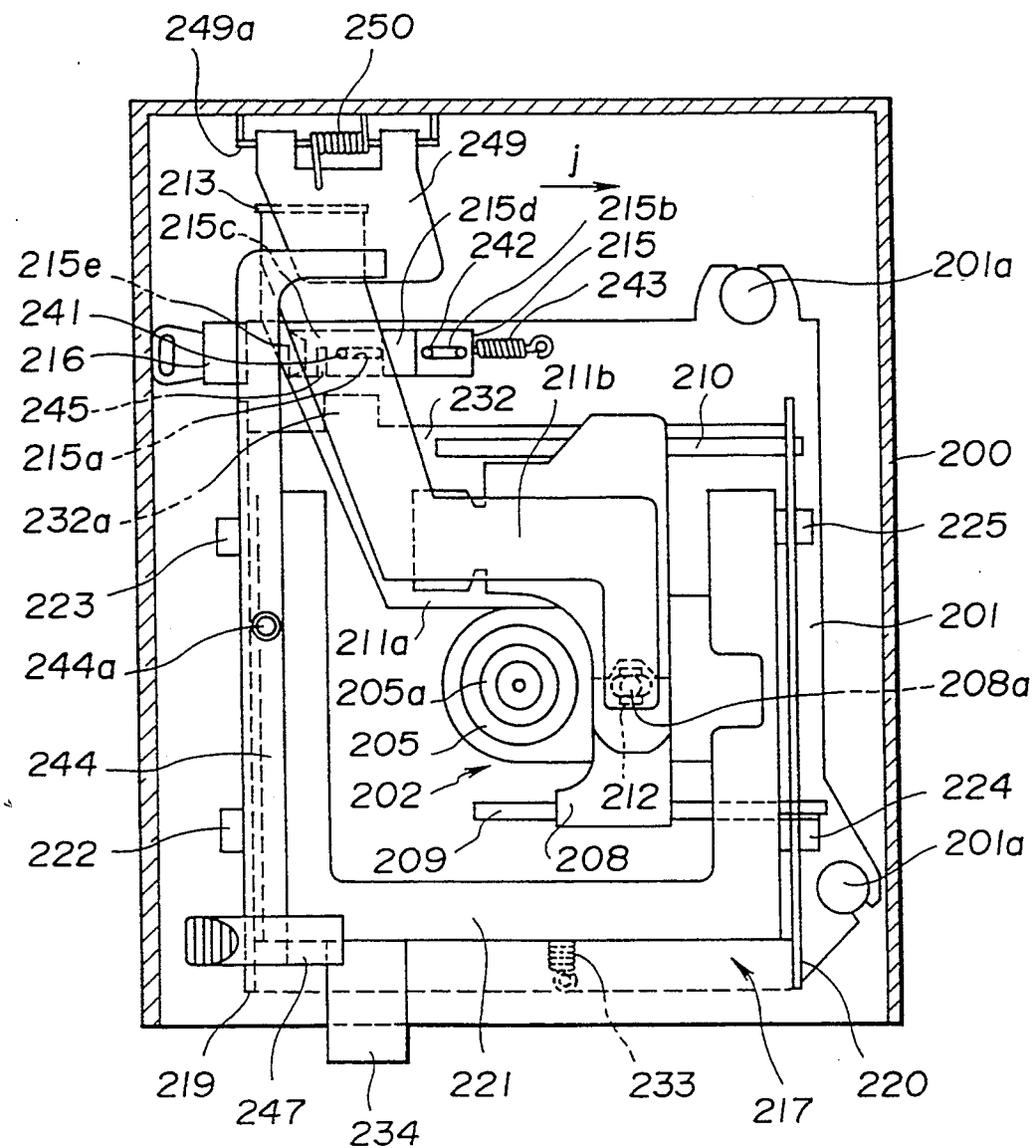
FIG. 9 is a side view, partially in cross-section, showing the loading state of the optical disc recording apparatus shown in FIG. 7.

The above mentioned other end of the recording setting transmission lever 244 is provided with an operating cam 246 and an inhibiting lever actuating lever 245, as shown in FIGS. 7 and 8. The operating cam 246 is provided at a portion of the lever 244 facing the magnetic head supporting arm thrusting plate 249, that is at the end of a side of the lever 244 facing the chassis 201. A profiling cam 251 is provided at a portion of the magnetic head supporting arm thrusting plate 249 facing the operating cam 246. The operating cam 246 and the profiling cam 251 are resiliently thrust against each other by the torsion coil spring 250.

Figure 13:
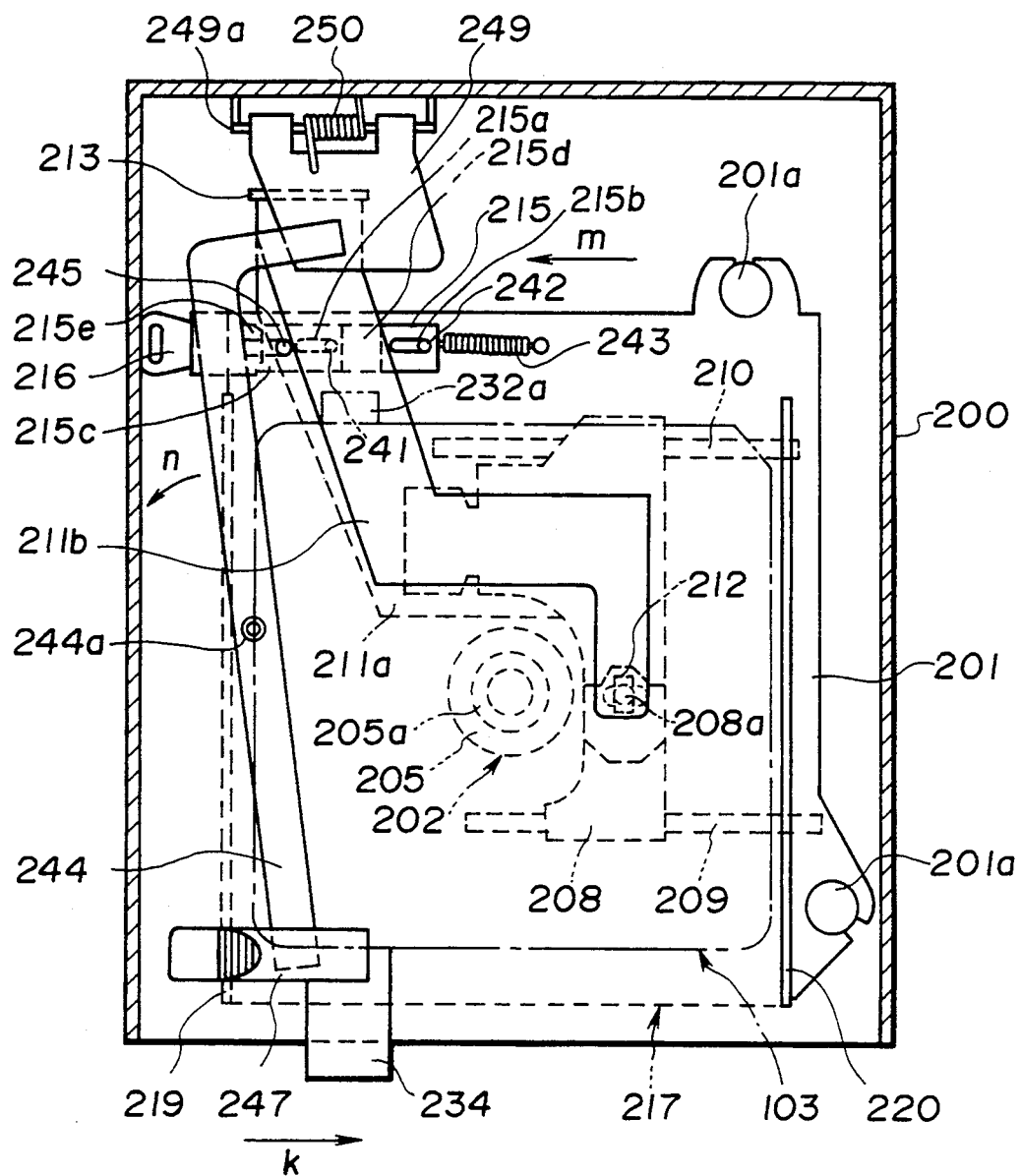
FIG. 13 is a plan view, partially in cross-section, showing the state in which the recording operation of the optical disc recording apparatus shown in FIG. 7 has been performed.

The operating cam 246 and the profiling cam 251 are so contoured that, when the recording setting transmission lever 244 is rotated so that its one end i s rotated towards the other lateral side of the outer casing 200, as shown by arrow n in FIG. 13, the thrusting plate 249 is rotated towards the chassis 201. That is, when the recording setting button 247 is operated and moved in the direction of starting the recording mode, as shown by arrow k in FIG. 13, the second magnetic head supporting arm 211b is thrust by the magnetic head supporting arm thrusting plate 249 so as to be rotated towards the chassis 201. At this time, the magnetic head device 212 is abutted at a predetermined contact pressure on the magneto-optical disc 101 placed on the disc table 205 as will be explained subsequently.

Meanwhile, the magnetic head supporting lever thrusting plate 249 is arranged for facing the proximal end of the second magnetic head supporting arm 211b even when the second magnetic head supporting arm 211b is moved with movement of the optical pickup device 208 across the inner and outer peripheries of the magneto-optical disc 101 placed on the disc table 205. Thus the magnetic head device 212 may be moved into and out of contact with the magneto-optical disc 101 without dependency on the position of the optical pickup device 208.

An armature 252 is mounted on the proximal end of the second magnetic head supporting arm 211b for facing a first trigger coil 253 attached to the bent forward side of the first magnetic head supporting arm 211a. The armature 252 can abut the first trigger coil 253 when the second magnetic head supporting arm 211b has rotated the magnetic head device 212 to a predetermined rotational position of being abutted on the magneto-optical disc 101. If, when the armature 252 and the first trigger coil 253 are abutted against each other, the optical disc recording apparatus is set to the recording mode, the armature 252 and the first trigger coil 253 are attracted to each other for locking the second magnetic head supporting lever 211b at the above mentioned predetermined rotational position.

A recording inhibition detecting lever 248 (see FIG. 7) is provided in the vicinity of the above mentioned one end of the recording setting transmission lever 244. This recording inhibition detecting lever 248 is supported for rotation within the outer casing 200. This recording inhibition detecting lever 248 has one end abutted against the cartridge proper 102 of the disc cartridge 103 at a predetermined position, while having its other end facing the recording setting button 247.

The one end of the recording inhibition detecting lever 248 is abutted on a portion of the cartridge proper 102 provided with a recording inhibition detecting hole, not shown, so as to be introduced into this detecting hole when it is opened. That is, the recording inhibition detecting lever 248 has its rotational angular position changed depending on the opening or closure of the detection hole. The other end of the recording inhibition detecting lever 248 is reciprocated with respect to the locus of movement of the recording setting button 247 depending on the changes in the rotational angular position of the lever 248 caused by the opening and closure of the recording inhibition detecting hole. Thus the recording inhibition detecting lever 248 detects the opening or closure of the recording inhibition detecting hole and, when the recording of information signals on the magneto-optical disc 101 is inhibited, the other end of the lever 248 acts for obstructing the movement of the recording setting button 247.

A disc cartridge loading unit 217 for loading the disc cartridge 103 on the driving device 202 is provided on the chassis 201.

Referring to FIGS. 7 to 11, the disc cartridge loading unit 217 is provided with side plates 219, 220 mounted on the chassis 201 with the disc table 205 in-between. These side plates 219, 220 are provided for extending in a direction normal to the guide shaft 209.

A cartridge holder 221, into which the disc cartridge 103 is inserted, is provided between the side plates 219, 220, so as to overlie the disc table 205. The cartridge holder 221 is formed as a casing the forward side of which is opened to permit the disc cartridge 103 to be inserted thereinto and a portion of the lower surface of which facing the chassis 201 as well as a portion of the lower surface of which facing the above portion of the lower surface are also opened, Either sides of the cartridge holder 221 facing the side plates 219, 220 are provided with supporting shafts 222, 223, 224 and 225. The shafts 222, 223 provided on one lateral side of the cartridge holder 221 facing the side plate 219 are engaged in mating guide slits 226, 227 formed in the side plate 219. The shafts 224, 225 provided on the other lateral side of the cartridge holder 221 facing the other side plate 220 are engaged in mating guide slits 228, 229 formed in the other side plate 220.

In this manner, the cartridge holder 221 is supported by the side plates 219, 220 by supporting shafts 222, 223, 224 and 225 engaging in mating guide slits 226, 227, 228 and 229. Each of the guide slits 226 to 229 is in the form of a letter L having a portion extending parallel to the chassis 201 and a portion bent from the rear end of the parallel portion towards the chassis 201. That is, the cartridge holder 221 is movably supported so that it is moved towards the rear along the chassis 201 as shown by arrow f in FIG. 8 and then moved for approaching the chassis 201 as shown by arrow g in FIG. 8.

A pair of tension coil springs 230, 231 are provided between the cartridge holder 221 and the side plates 219, 220. These tension coil springs are mounted at mid portions of either sides of the cartridge holder 221 so that these coil springs are substantially at right angles to the chassis 201 when the cartridge holder 221 is positioned at the forward side. Thus, when the cartridge holder 21 is moved towards the rear, it is biased forwards and obliquely downwards by the tension coil springs 230, 231 and, when the supporting shafts 222 to 225 reach the rear ends of the guide slits 226 to 229, the cartridge holder 221 is moved for approaching the chassis 201.

A shutter member opening pin 240 is projectingly mounted at a position on the inner side of the cartridge holder 221 mating with the side of the disc cartridge 103 introduced into the cartridge holder 221 mounting the shutter member 105. When the disc cartridge 103 is introduced into the inside of the cartridge holder 221, the shutter member opening pin 240 is intruded into the shutter opening slit 108 for being abutted against and resiliently deflecting the locking member 107 for releasing retention of the shutter member 105.

An ejection plate 232 is provided between the chassis 201 and the cartridge holder 221. This ejection plate 232 is mounted for sliding in the fore and aft direction on the chassis 201 and is biased for movement forwardly as shown by arrow i in FIG. 8 by a tension coil spring 233 provided between the forward part of the ejection plate 232 and the chassis 201. The forward end of the ejection plate 232 is provided with a thrusting tab 234. When the thrusting tab 234 is thrust as with a finger, the ejection plate 232 is moved towards the rear as shown by arrow h in FIG. 8, against the force of the tension coil spring 233.

On both sides of the ejection plates 232, ejection cams 235, 236, 237 and 238 are protuberantly formed along the side plates 219, 220. Each of these cams 235 to 238 is provided with an inclined cam surface having its forward side lying closer to the chassis 201 than its rear side, such that, when the ejection plate 232 is moved towards the rear, the ejection cams are abutted against the supporting shafts 222 to 225, positioned at the rear ends of the guide slits 226 to 229, from the side of the chassis 201.

Figure 10:
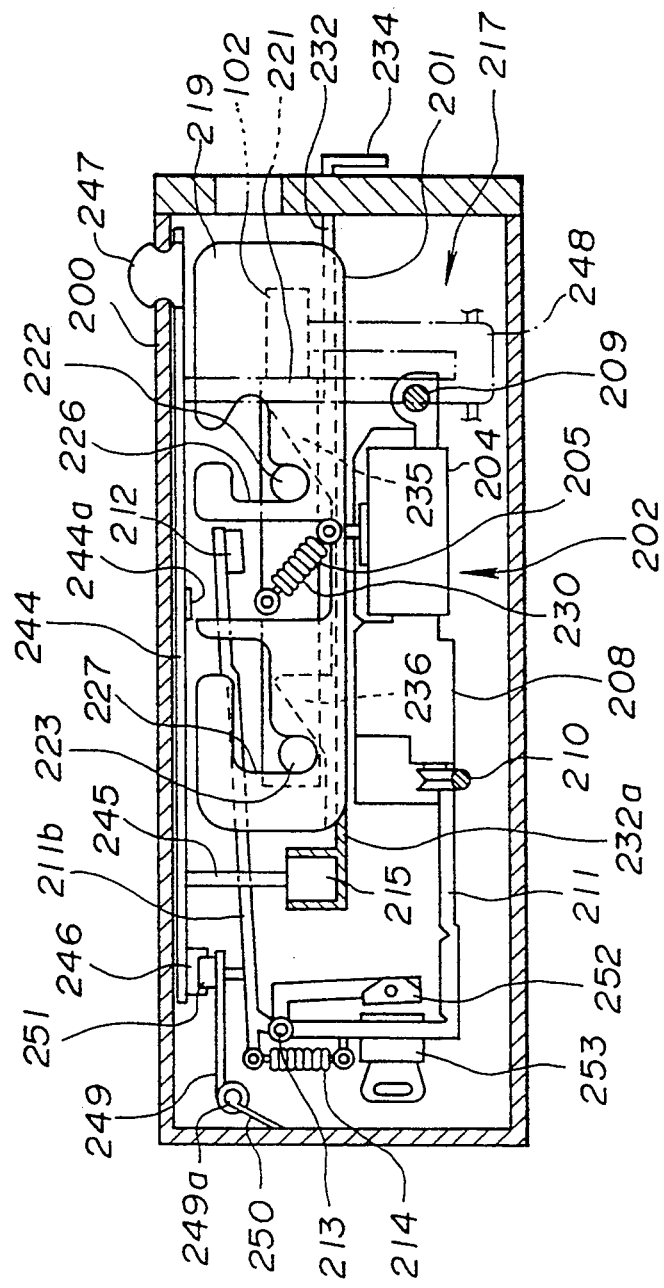
FIG. 10 is a side view, partially in cross-section, showing the post-loading state of the optical disc recording apparatus shown in FIG. 7.

With the above described disc cartridge loading unit 217, when the disc cartridge 103 is introduced into the cartridge holder 221, as shown by arrow d in FIG. 7, the shutter member 105 is first moved relative to the cartridge proper 102 by the shutter member opening pin 240 for opening the recording/reproducing apertures. When the cartridge proper 102 is further introduced into the inside of the cartridge holder 221, the cartridge holder 221 is thrust by the cartridge proper 102 and thereby moved towards the rear as shown by arrow f in FIG. 8. The cartridge holder 221 is then moved in a direction of approaching the chassis 201, as shown by arrow g in FIG. 8, under the force of the tension coil springs 230, 231, At this time, the disc table 205 is introduced into the cartridge proper 102, via chucking aperture 109, as shown in FIG. 10, and holds the magneto-optical disc 101 by the tapered projection 205a engaged in the chuck hole 101a.

On the other hand, the cartridge proper 102 is positioned and held by positioning pins, not shown, on the chassis 201, introduced into the positioning holes 110, 111. In this state, the magneto-optical disc 101 may be rotated along with the disc table disc table 205 by the spindle motor 204. The magneto-optical disc 101 is faced by the object lens 208a of the optical pickup device 208.

For setting the optical disc recording apparatus to its recording mode, the disc cartridge 103 is loaded in position, as described above, and the recording setting button 247 is slid y manual operation. The magnetic head device 212 is then moved towards the magneto-optical disc 101, at the same time that the disc 101 is rotated and irradiated with a laser beam from the optical pickup device 208 for recording of information signals on the magneto-optical disc 101. That is, during the recording mode, the magnetic head device 212 is slidingly contacted with the magneto-optical disc 101 with a predetermined contact pressure, while the laser beam is irradiated by the optical pickup device 208 for heating predetermined regions of the magneto-optical disc 101 for recording the information signals on the disc 101.

For taking out the disc cartridge loaded on the disc cartridge loading unit 217, the thrusting tab 234 is thrust as by a finger for shifting the ejection plate 232 towards the rear against the bias of the tension coil spring 233 by way of an ejecting operation. When this ejecting operation is performed, the ejection plate 232 is moved towards the rear against the bias of the tension coil spring 233. The ejection cams 235 to 238 are then abutted on the supporting shafts 222 to 225 from the side of the chassis 201 for displacing the cartridge holder 221 away from the chassis 201 by the interposition of the supporting shafts 222 to 225. When the cartridge holder 221 is moved away from the chassis 201, the cartridge holder 221 is moved along the chassis 201 towards the forward side, in a direction opposite to that shown by arrow f in FIG. 8, under the bias of the tension coil springs 230, 231, for ejecting the disc cartridge 103 out of the outer casing 200.

Meanwhile, the present optical disc recording apparatus is similarly provided with an ejection locking unit for preventing an ejecting operation from being performed until the recording of table-of-contents information (TOC information) following the end of the recording of the information signals on the magneto-optical disc 101.

Referring to FIGS. 12 to 15, the ejection locking unit is constituted by an ejection inhibiting lever 215, an armature 215e mounted on the ejection inhibiting lever 215 for functioning as locking means and a second trigger coil 216 functioning as controlling means.

The ejection inhibiting lever 215 is mounted for sliding across the side plates 219, 220 at a position on the chassis 201 lying closer to the rear end than the side plates, 219, 220. That is, this ejection inhibiting lever 215 is a substantially rectangular plate supported for sliding longitudinally by having supporting pins 241, 242 implanted on the chassis 201 introduced into oblong holes 215a, 215b. The ejection inhibiting lever 215 is biased by a tension coil spring 243 provided between the lever 215 and the chassis 201 in a direction of being removed away from the side plate 219 and approaching the other side plate 220, as shown by arrow j in FIG. 9.

A thrust piece 215c and an ejection inhibiting lug 215d are protuberantly formed on the upper surface of the ejection inhibiting lever 215. The thrust piece 215c and the ejection inhibiting lug 215d are arrayed side by side along the sliding direction of the ejection inhibiting lever 215. The thrust piece 215c is positioned for facing the forward side of the inhibiting lever operating lever 245 provided at the other end of the recording setting transmission lever 244 positioned at the rear side within the outer casing 200 for depending towards the chassis 201. The ejection inhibiting piece 215d is formed for facing an abutment lug 232a protuberantly formed at the rear end edge of the ejection plate 232 when the ejection inhibiting lever 215 is moved towards one side against the bias of the tension coil spring 243. An attractable member 215e is provided at one end of the ejection inhibiting lever 215.

The second trigger coil 215 is mounted on the chassis 201 for facing the armature 215e. The second trigger coil is positioned for being abutted by the armature 215e when the ejection inhibiting lever 215 is moved in one direction.

Figure 12:
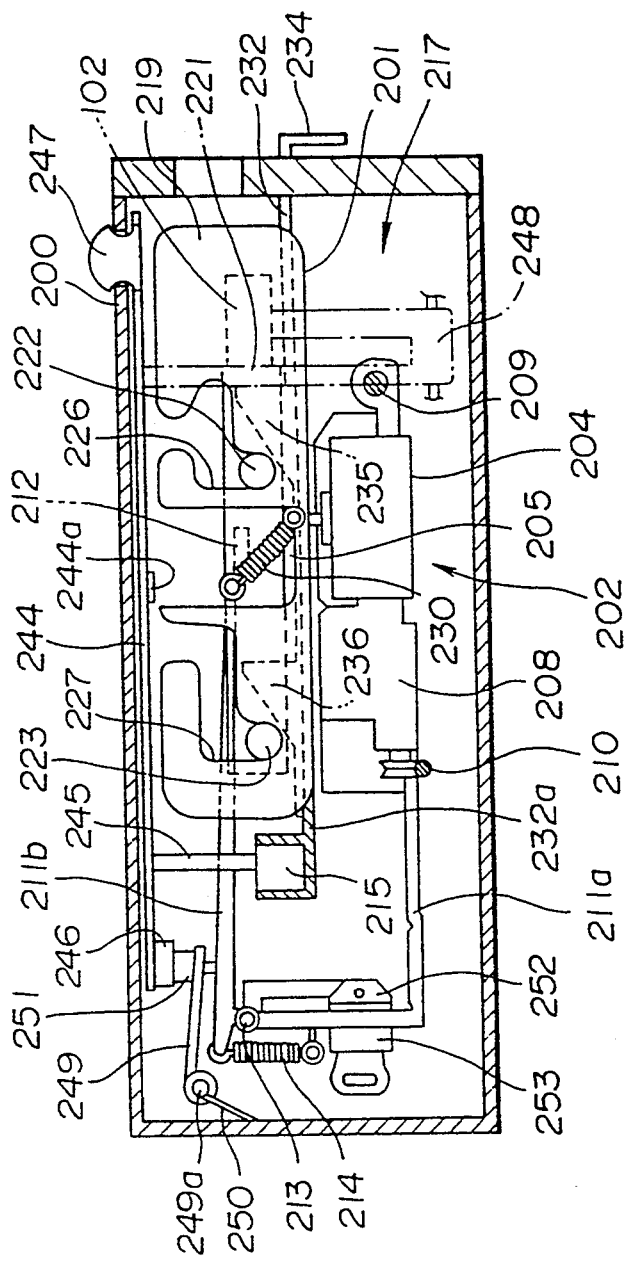
FIG. 12 is a side view, partially in cross-section, showing the state in which the recording operation of the optical disc recording apparatus shown in FIG. 7 has been performed.

With the above described ejection locking unit, as shown in FIGS. 12 and 13, when the recording setting button 247 is moved as shown by arrow k in FIG. 13, the inhibiting lever actuating lever 245 of the recording setting transmission lever 244 shifts the ejection inhibiting lever 215 by thrusting the thrust piece 215c. The ejection locking lever 215, having its thrust piece 215c thrust in this manner, is shifted towards one side or in a direction of approaching the side plate 219 as shown by arrow m in FIG. 13.

If, when the ejection inhibiting lever 215 is shifted towards the side plate 219 and the armature 215e of the ejection inhibiting lever 215 ia abutted on the second trigger coil 216, the optical disc recording apparatus is set to its recording mode, the second trigger coil 216 and the armature 215e are attracted to each other. The ejection inhibiting lever 215 is then locked with the armature 215e abutted against the second trigger coil 216. The ejection inhibiting lug 215d is positioned at this time for facing the foremost part of the abutment lug 232a of the ejection plate 232.

Figure 14:
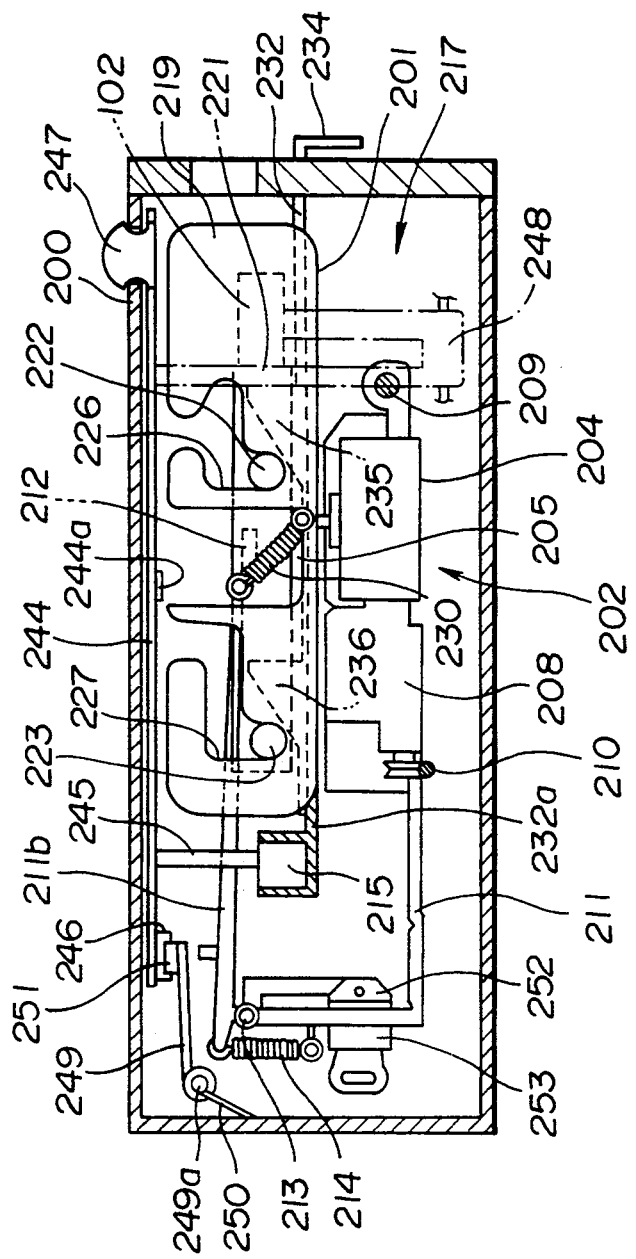
FIG. 14 is a side view, partially in cross-section, showing the state in which the optical disc recording apparatus shown in FIG. 7 has been set to its recording mode.
Figure 15:
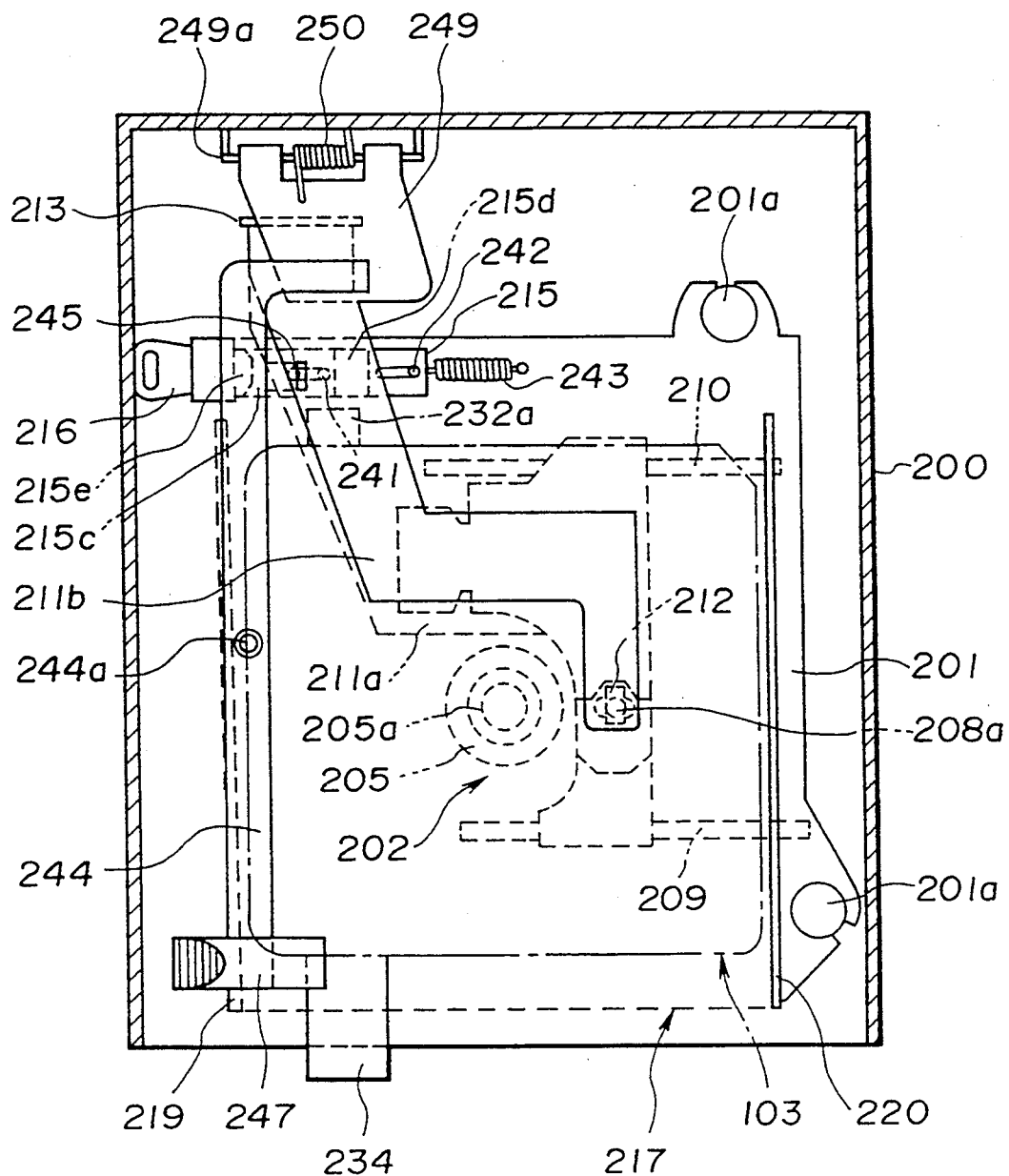
FIG. 15 is a plan view, partially in cross-section, showing the state in which the optical disc recording apparatus shown in FIG. 7 has been set to the recording mode.

When the manual operation on the recording setting button 247 is released, the recording setting button 247 is reset to its initial position, as shown in FIGS. 14 and 15. Since the ejection inhibiting lever 215 remains attracted at this time by the second trigger coil 216, the ejection plate 232 is inhibited from its movement by abutment of the abutment lug 232a against the ejection inhibiting piece 215 and hence can not be moved even if the thrusting section 234 is thrust by way of performing an ejecting operation. Thus the ejecting operation is inhibited in the recording mode of the optical disc recording apparatus.

When the stop button, not shown, is actuated for releasing the recording mode of the present optical disc recording apparatus, recording of information signals on the magneto-optical disc comes to a close, and recording of the TOC data is initiated. During the recording of the TOC data, the ejection inhibiting lever 215 and the magnetic head device 212 are kept in the state of the recording mode described in connection with FIGS. 14 and 15. Thus, with the present optical disc recording apparatus, the ejecting operation is inhibited even during the recording of the TOC data.

Figure 11:
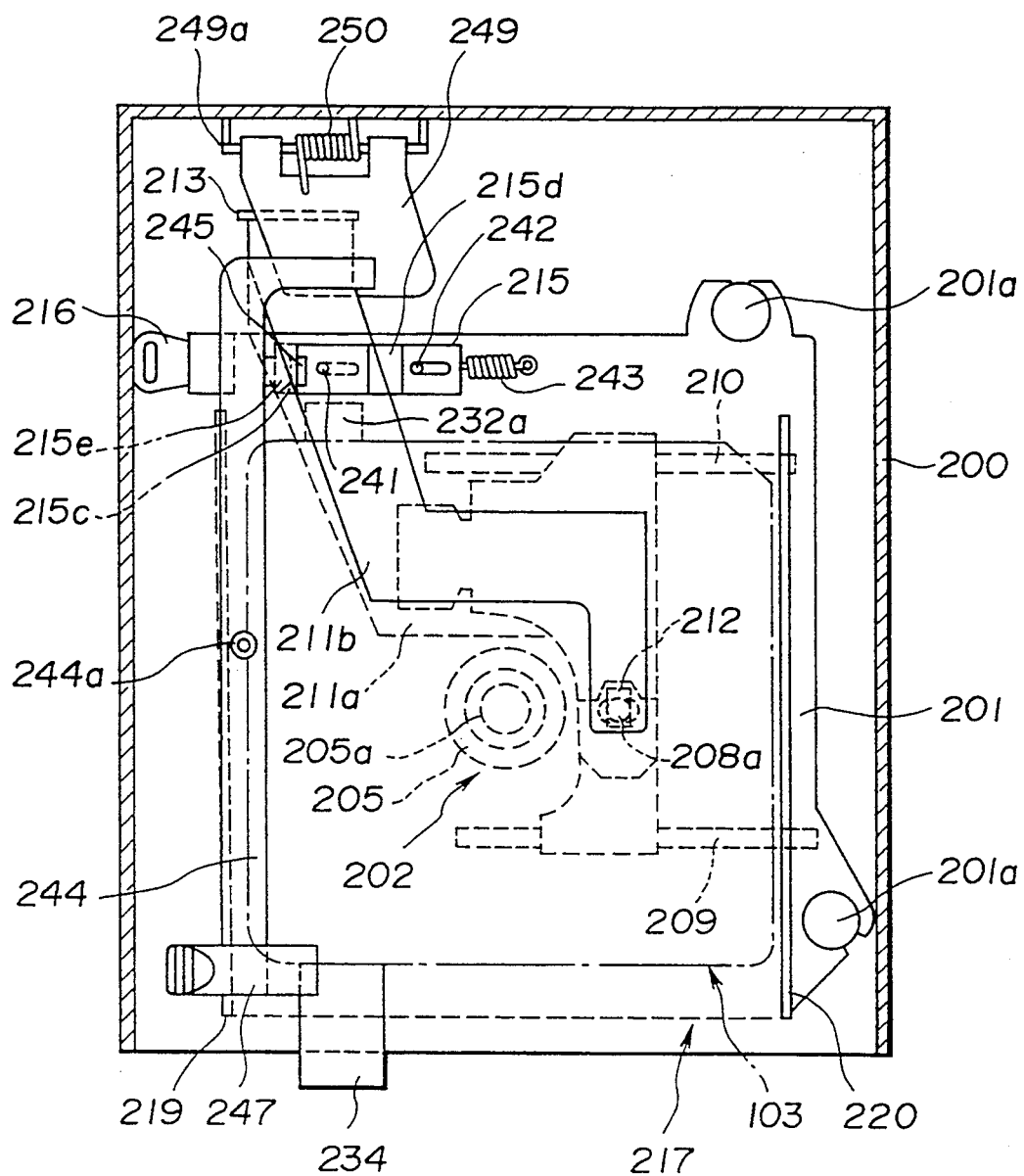
FIG. 11 is a plan view, partially in cross-section, showing the post-loading state of the optical disc recording apparatus shown in FIG. 7.

After the end of the recording of the TOC data, attraction of the trigger coils 216, 253 to the ejection inhibiting lever 215 and the armature 252 is released by the controlling means. The ejection inhibiting lever 215 is then reset to its initial position under the bias of the tension coil spring 243 as shown in FIG. 11. Therefore, if the thrusting section 234 is thrust at this time, the ejection plate 232 is moved towards the rear as shown by arrow h in FIG. 8, with the abutment lug 232a being introduced into a space between the thrust piece 215c and the ejection inhibiting piece 215d. The ejecting operation is performed by this rearward movement of the ejection plate 232. That is, with the present optical disc recording apparatus, the ejecting operation is enabled when the recording of the TOC data is terminated.

What is claimed is:

1. An optical disc recording apparatus comprising:
   disc driving means for rotationally driving an optical disc accommodated in a disc cartridge, on which information signals are recorded for being read subsequently optically;
   recording means moved radially of said optical disc in said disc cartridge rotationally driven by said disc driving means for recording information signals on said optical disc via an aperture in said disc cartridge;
   transporting means for transporting said disc cartridge between a lower position in which said disc cartridge is loaded in said disc driving means and a raised position in which said disc cartridge is moved in the inserting and ejecting direction;
   a casing accommodating said disc driving means and said transporting means and having an opening for insertion and ejection of said disc cartridge;
   a recording setting device which, when activated by a user, initiates a start of recording of information signals on the optical disc;
   an ejection inhibiting lever connected to the recording setting device to be moved at the start of recording of the information signals on the optical disc from an initial position to an inhibition position for inhibiting a movement of said disc cartridge in an ejecting direction by said transporting means;
   inhibiting means for inhibiting resetting of said ejection inhibiting lever to the initial position, and
   controlling means connected to the inhibiting means for causing the inhibiting means to cease inhibiting resetting of said ejection inhibiting lever to said initial position after the end of recording of a table-of-contents signal after recording of said information signals on said optical disc.

2. The optical disc recording apparatus as claimed in claim 1 wherein said inhibiting means comprises electromechanical holding means for holding said ejection inhibiting lever at a position of inhibiting the resetting of the ejection inhibiting lever to said initial position.

3. An optical disc recording apparatus comprising:
   disc driving means for rotationally driving an optical disc on which information signals are recorded for subsequently optically reading the recorded signals;
   recording means moved radially of said optical disc rotationally driven by said disc driving means for recording information signals on said optical disc;

a casing accommodating said disc driving means and said recording means therein so that said optical disc may be loaded on said disc driving means and a recording operation may be made on said optical disc loaded on said disc driving means;

a manually operable lid rotationally mounted on said casing for overlying said optical disc loaded on said disc driving means and closing off access to the optical disc while the optical disc is loaded on the disc driving means;

locking means for locking said lid in a closed state with respect to the casing;

a manually operable recording start device connected to the recording means for initiating the start of recording of information signals by the recording means on the optical disc loaded on the disc driving means;

an ejection inhibiting lever connected to the recording start device to be moved from an initial position to an inhibiting position at the start of recording of information signals on said optical disc, wherein the ejection inhibiting lever inhibits opening of said lid when the ejection inhibiting lever is positioned at the inhibiting position;

inhibiting means for inhibiting resetting of said ejection inhibiting lever to the initial position, and controlling means connected to the inhibiting means for causing the inhibiting means to cease inhibiting resetting of said ejection inhibiting lever to said initial position after the end of recording of a table-of-contents signal after recording of said information signals on said optical disc.

4. The optical disc recording apparatus as claimed in claim 3 wherein said inhibiting means comprises electromechanical holding means for holding said ejection inhibiting lever at a position of inhibiting the resetting of the ejection inhibiting lever to said initial position.

5. An optical disc recording apparatus for recording information signals on an optical disc by recording means for subsequently optically reading the recorded signals, comprising:

a recording setting device which, when activated by a user, initiates a start of recording of information signals on the optical disc;

an ejection inhibiting lever connected to the recording setting device to be moved at the start of recording of the information signals on the optical disc from an initial position to an inhibition position for inhibiting a manual ejecting operation of taking out said optical disc;

inhibiting means for inhibiting resetting of said ejection inhibiting lever from the inhibition position to the initial position, wherein said inhibiting means comprises electromechanical holding means for holding said ejection inhibiting lever at a position of inhibiting the resetting of the ejection inhibiting lever to said initial position;

controlling means connected to the inhibiting means for causing the inhibiting means to cease inhibiting resetting of said ejection inhibiting lever to said initial position after the end of recording of a table-of-contents signal after recording of said information signals on said optical disc.

* * * * *